United States Patent [19]
Varga

[11] Patent Number: 5,331,796
[45] Date of Patent: Jul. 26, 1994

[54] METHOD AND APPARATUS FOR APPLYING STACKED OPTICAL FIBER RIBBONS ABOUT A CYLINDRICAL CORE OF A FIBER OPTIC CABLE

[75] Inventor: Andre Varga, Willowdale, Canada
[73] Assignee: Ceeco Machinery Manufacturing Limited, Concord, Canada
[21] Appl. No.: 946,270
[22] Filed: Sep. 16, 1992
[51] Int. Cl.$^5$ .......................................... D01H 13/04
[52] U.S. Cl. ........................................... 57/9; 57/11; 57/264; 57/352
[58] Field of Search .................. 57/6, 9, 10, 11, 12, 57/13, 14, 59, 60, 62, 63, 64, 65, 66.5, 68, 92, 93, 94, 105, 91, 293, 264, 310, 311, 352; 226/29, 44; 242/64, 75; 385/105

[56] References Cited

U.S. PATENT DOCUMENTS

| | | | |
|---|---|---|---|
| 140,934 | 7/1873 | Mayall | 57/13 |
| 146,222 | 1/1874 | Alton | 57/13 |
| 328,172 | 10/1885 | Andrews | 57/13 |
| 601,834 | 4/1898 | Huestis | 57/13 |
| 1,334,086 | 10/1920 | Finkelstein | 57/13 |
| 2,118,847 | 5/1938 | Katz | 57/235 |
| 2,458,243 | 1/1949 | Biddle | 57/229 |
| 3,187,495 | 6/1965 | Christian, Jr. | 57/213 |
| 3,274,846 | 9/1966 | Forster | 57/213 |
| 3,339,012 | 8/1967 | Hutchins, Jr. | 57/213 |
| 3,481,549 | 12/1969 | Cullen et al. | 57/11 |
| 4,129,468 | 12/1978 | Knab | 57/7 |
| 4,143,942 | 3/1979 | Anderson | 57/7 |
| 4,156,624 | 12/1979 | de Vecchis et al. | 57/361 |
| 4,170,510 | 10/1979 | Brorein et al. | 156/432 |
| 4,237,687 | 12/1980 | de Vecchis et al. | 57/361 |
| 4,248,035 | 2/1981 | Skillen et al. | 156/166 |
| 4,332,131 | 6/1982 | Palsky et al. | 57/7 |
| 4,385,485 | 5/1983 | Yonechi | 57/7 |
| 4,388,800 | 6/1983 | Trezeguet et al. | 57/6 |
| 4,395,869 | 8/1983 | Priaroggia et al. | 57/13 |
| 4,450,676 | 5/1984 | Sakamoto et al. | 57/6 |
| 4,497,164 | 2/1985 | Dotti et al. | 57/6 |
| 4,576,362 | 3/1986 | Langston | 57/6 |
| 4,587,801 | 5/1986 | Missout et al. | 57/6 |
| 4,619,107 | 10/1986 | Missout et al. | 57/6 |
| 4,635,430 | 10/1987 | Missout et al. | 57/6 |
| 4,757,675 | 10/1988 | Oglesby et al. | 57/6 |
| 4,787,702 | 11/1988 | Khalil | 57/63 |
| 4,805,392 | 2/1989 | Seveso et al. | 57/6 |
| 4,825,629 | 5/1989 | Missout et al. | 57/6 |
| 4,833,871 | 5/1989 | Ogawa et al. | 57/6 |
| 4,836,503 | 6/1989 | Giroux | 57/6 |
| 4,856,266 | 8/1989 | Ogawa et al. | 57/9 |
| 4,875,661 | 8/1989 | Langston | 254/134.3 |
| 4,949,537 | 8/1990 | Rawlyk et al. | 57/7 |
| 5,029,816 | 7/1991 | Langston | 57/7 |
| 5,042,904 | 8/1991 | Story et al. | 57/6 |

OTHER PUBLICATIONS

Preliminary Research into Ultra High Density and High Count Optical Fiber Cables, International Wire & Cable Symposium Proceedings 1991, pp. 8 through 23.

Primary Examiner—Clifford D. Crowder
Assistant Examiner—Larry D. Worrell, Jr.
Attorney, Agent, or Firm—Lackenback Siegel Marzullo Aronson & Greenspan

[57] ABSTRACT

Fiber optic filaments or ribbons are deflected by a system of sheaves to converge at final filament deflection sheaves which direct the filaments along the longitudinal direction of an assembly table. Successive sets of filament deflection sheaves stack the filaments into bundles which are separated by spacer elements which are likewise guided to the assembly table. Sensors at the final sheaves monitor the tensions in both the filaments and separators and a controller is used to adjust the tensions to compensate for frictional variations upstream of the final sheaves. The table is positioned at an angle to the machine axis so that the stacked filament bundles and separators can be wound about a rotating core by being drawn along the table by the rotating core for staggered and tangential application of the filaments about the core at the downstream end of the table. The apparatus and method can be used to produce optical fiber cables in which the fibers can be wound either within helical grooves formed within the core or about the cylindrical surface of a smooth core. Any number of filament units can be wound about the core and any number of filaments or ribbons can be stacked in one or more of the filament units or bundles. The apparatus and method of the invention are extremely versatile and can produce both simple and complex fiber optic cables including hundreds of fiber optic filaments, ribbons or strands in a simple and economical manner.

30 Claims, 4 Drawing Sheets

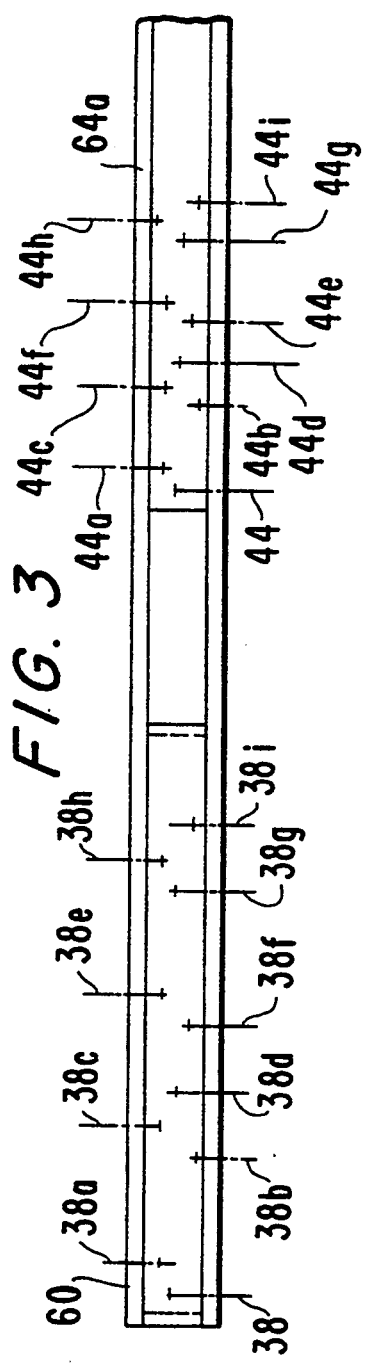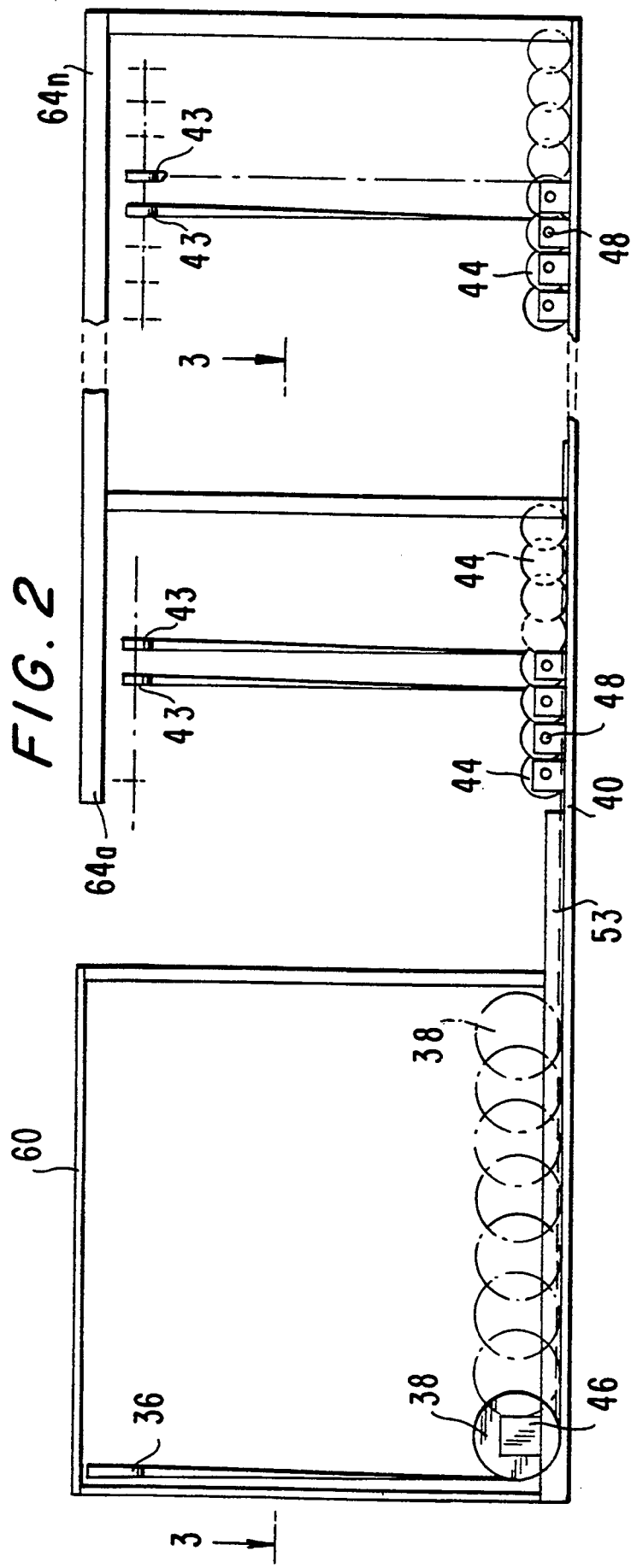

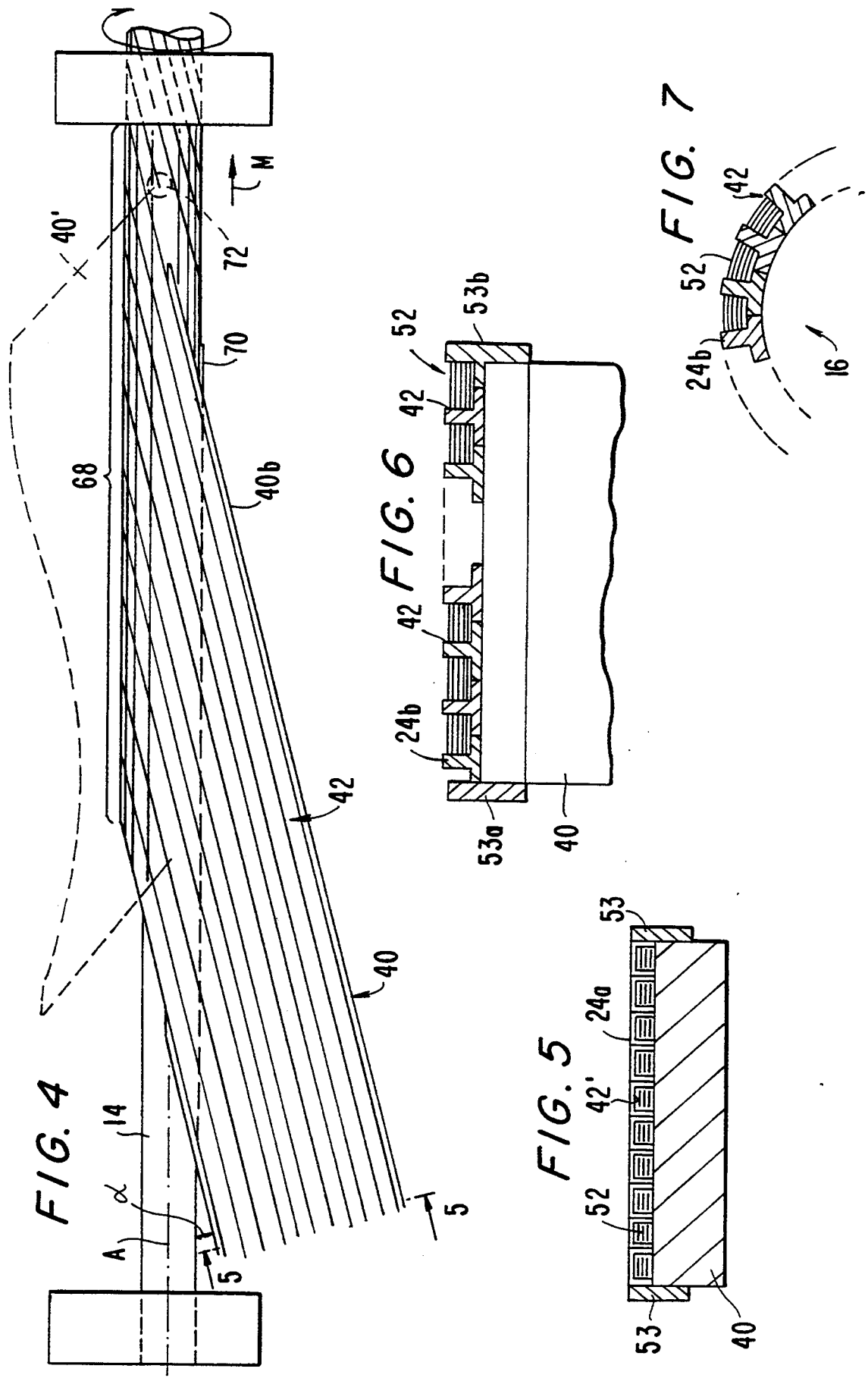

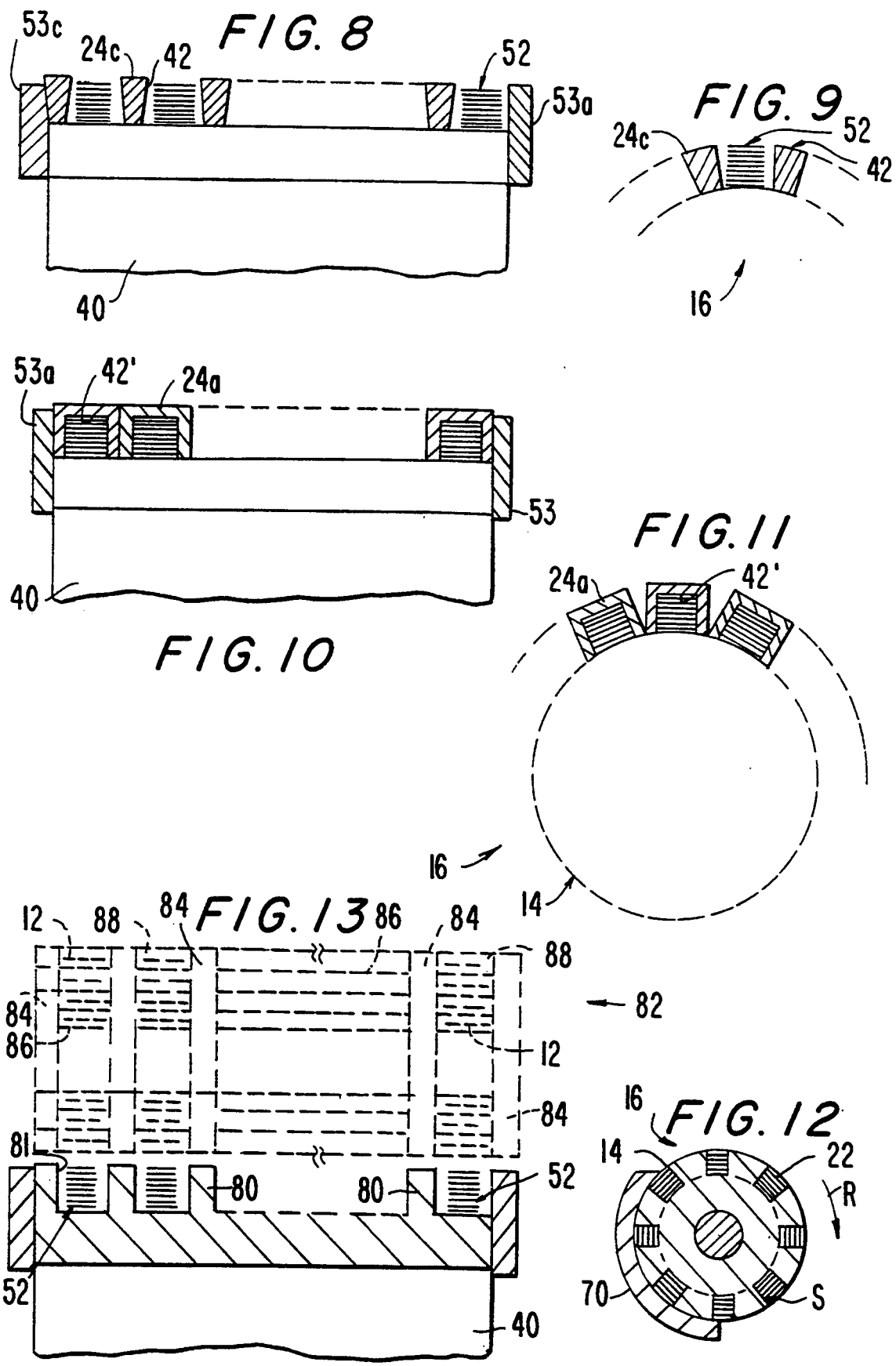

METHOD AND APPARATUS FOR APPLYING STACKED OPTICAL FIBER RIBBONS ABOUT A CYLINDRICAL CORE OF A FIBER OPTIC CABLE

BACKGROUND OF THE INVENTION

1. Field of the Invention

The present invention generally relates to a method and apparatus for applying filaments about a cylindrical core and, in particular, to a method and apparatus for applying stacked bundles of filaments or ribbons into helical grooves in a slotted core or on the exterior surface of an elongated cylindrical strength member.

2. Description of the Prior Art

Devices to insert filaments, especially fiber optic ribbons, into grooves have been used in the past. These devices are broadly divided into two categories.

In the first category of devices, the fibers are loaded on a rotating cage while the slotted core does not rotate. The cage containing the fiber optic bobbins rotates around the slotted core following the slots. Such a system is shown in U.S. Pat. Nos. 4,587,801; 4,619,107 and 4,635,430. In the second category, the slotted core is made to rotate around its own axis while passing through the application point. The fibers in this case are carried by stationary bobbins and are inserted into the slots. Examples of this method are shown in U.S. Nos. 4,833,871 and 4,388,800.

For fiber optic filaments to be inserted into slotted cores, one usually assembles the fibers in bundles, stacks or packets and, in the last few years, fiber optic bundles have also been embedded in special plastic compounds, laid side-by-side to form a ribbon-like structure.

Fiber optic ribbons have been incorporated into cables in a variety of ways, one of which is to insert several stacked ribbons into slotted cores similar to the ones mentioned in the above prior art. Such ribbons have been known to be wound on cylindrical cores together with spacers that are inserted to create containment means to keep in place the packets of ribbons over the cylindrical support core. The application of ribbons and of packets of stacked ribbons requires specific care because ribbons, contrary to fiber optic bundles or fiber optics in a tube, can obviously be bent only in one direction and cannot be bent sideways. Therefore, the inserting devices that have been used for ribbon and ribbon packets are very complicated by the fact that it is very cumbersome to bring all the ribbon elements in a ringed configuration which will allow the insertion of the ribbon or ribbon packets around the circumference of the slotted or cylindrical core.

Furthermore, the application devices have also been complicated by the generally high number of guide pulleys that are required, making it very difficult to control and measure the actual tension with which the ribbons or the packets of ribbons are deposited in the slots or wound on the cylindrical core at the application point. One must bear in mind that when a packet or stack of ribbons are applied or wound onto a cylindrical surface, the speed of each ribbon in the packet increases slightly from the inner ribbon to the outer ribbon and, therefore, it is important that the ribbons in the packet are allowed to slide in relation to each other. In a circumferential insertion machine, this requires that each ribbon in the packet be brought in contact with the adjacent ribbon at the last possible moment, close to the application point. Therefore, the device becomes very cumbersome, particularly when many hundreds of ribbons might have to be brought together to converge at the closing point.

Most of the aforementioned apparatus for assembling or manufacturing fiber optic cables do not take into account that the optical properties of the fiber optic ribbons are very sensitive to any physical stress on the ribbons. However, because the ribbons are exposed to frictional forces as they are guided through the machine, the ribbons are subject to stresses and the tensions that are applied to the ribbons become and important consideration. A number of references have been discussed and have sought to address this problem. In U.S. Pat. No. 4,248,035, an apparatus is disclosed for assembling a fiber optic cable which seeks to avoid destructive tensile and compressive stresses in the fiber optic ribbons when the cable is bent and the grooves in which the fibers are inserted are helical in form. To minimize longitudinal tension in the fibers, air is directed along the surface of the cable in the feed direction. The tubes are sealed at the upstream end, the other tube extending beyond the inner tube by the downstream end. The air jet both frictionally urges fibers in the feed direction and creates a partial vacuum over the fibers to locally reduce contact pressure between the fibers and the central strength filament.

In U.S. Pat. No. 4,450,676, an apparatus is disclosed for stranding optical fiber cores while slackening them. A core delivery system is provided which has a passage for passing the optical fiber cores through it and a gas which flows from the back position of the passage towards the front functions to send out the optical fiber cores at the inlet side of the core storing spaces. The tensile forces on the optical fiber core at the inlet sides are decreased by a winding drum mechanism.

In U.S. Pat. No. 4,805,392, an optical fiber manufacturing apparatus is disclosed which seeks to prevent tensile stresses on the optical fibers. This is achieved by means of an inserting head, a photoelectric optical system between the supply bobbins and the inserting head to provide signals indicating the positions of the optical fibers advancing from the supply bobbins. A control device is connected to the photoelectric system and is responsive to the signals generated therefrom to control the speed at which the optical fibers are paid off from the supply bobbins.

SUMMARY OF THE INVENTION

Accordingly, it is an object of the present invention to provide a method and apparatus for applying stacked ribbons, such as optical fiber ribbons, about cylindrical cores of cables which do not have the disadvantages inherent in prior art methods and apparatus.

It is another object of the present invention to provide an apparatus and method of providing a closing die system for optical fiber cables which is simple in construction and economical to manufacture.

It is still another object of the present invention to provide a method and apparatus as aforementioned in the previous objects which permits tension control and stretching of the individual optical fiber strands or ribbons in each bundle or stack.

It is yet a further object of the present invention to provide a method and apparatus for manufacturing optical fiber cables with stacks of optical fibers helically wound about cable cores which utilizes a fixed or stationary supply system and a core that rotates about its axis.

It is still a further object of the present invention to provide a method and apparatus for manufacturing optical cables with stacked optical fibers or ribbons which are helically wound about cable cores with a wide range of separators for separating adjoining stacks or bundles of optical fibers or ribbons when the same are applied to the exterior cylindrical surface of the cable core.

In order to achieve the above and other objects, the invention comprises a closing die system to be used in a line of the second category described above, i.e. a line where the slotted core or the cylindrical core is rotated while the fiber optic ribbons are stationary.

Instead of inserting, as in the prior art, all the filaments or ribbons radially at a fixed closing point, the filaments or ribbons are inserted tangentially in the slots at longitudinally or axially staggered points lengthwise on the slotted core. This system allows a much simpler filament path and also allows, in the case of ribbon packets, the possibility of each ribbon sliding on its adjacent counterpart or on filament separators very easily since, after the last deviation pulley or sheave, the ribbons proceed in a substantially straight line to the staggered application point.

The system also allows the possibility of controlling the tension at which each of the individual ribbons or filaments is applied at the application point by simply controlling the tension at the last deviation pulley.

The only difference between the tension measured at this point and the one at the application point is the friction between adjacent layers or filaments on separators and this is minimal because of the substantially straight path followed by the filaments or ribbons, the absence of pressure on the ribbon packets and the minimal relative speed between ribbons in the same packet.

Furthermore, the system allows the formation of packets of filaments or ribbons before the application point, making it much simpler to handle a large number of elements.

BRIEF DESCRIPTION OF THE DRAWINGS

The present invention will be explained in detail by reference to the embodiment which is shown in the accompanying drawings.

FIG. 2 is a fragmented front elevational view of the assembling and tension sensing station shown in FIG. 1;

FIG. 3 is a cross-sectional view of the station shown in FIG. 2, taken along line 3—3;

FIG. 4 is a top plan view of the longitudinal application station shown in FIG. 1;

FIG. 5 is a cross-sectional view of the assembly table shown in FIG. 4, taken along line 5—5, and illustrating packets or stacks of fiber optic ribbons being guided along the assembly table and separated from each other by means of separators or spacers;

FIG. 6 is similar to FIG. 5, but showing inverted T-shaped separator elements instead of the inverted U-shaped separator elements of FIG. 5;

FIG. 7 is a schematic partial front elevational view of the wound optical cable using the separator elements shown in FIG. 6;

FIG. 8 is similar to FIG. 6, but showing inverted trapezoidal-shaped separator elements;

FIG. 9 is similar to FIG. 7, but showing the elements illustrated in FIG. 8;

FIG. 10 is similar to FIGS. 6 and 8, but showing the inverted U-shaped elements of the type illustrated in FIG. 5;

FIG. 11 is similar to FIGS. 7 and 9, but showing the elements illustrated in FIG. 10;

FIG. 12 and 13 is a view of a cable in accordance with the present invention where the cable core is provided with helical grooves into which the fiber optic packets or stacks are placed without the use of separator elements; and FIG. 13 is similar to FIG. 6, in which the separators for adjacent packets are integrally formed on the table or guide support member, and also illustrating a frame in the form of a lattice structure provided adjacent to the table or guide support which defines a plurality of openings that serve as positioning diodes to maintain desired orientations and positions of ribbons relative to each other.

DESCRIPTION OF THE PREFERRED EMBODIMENT

Figure 1:
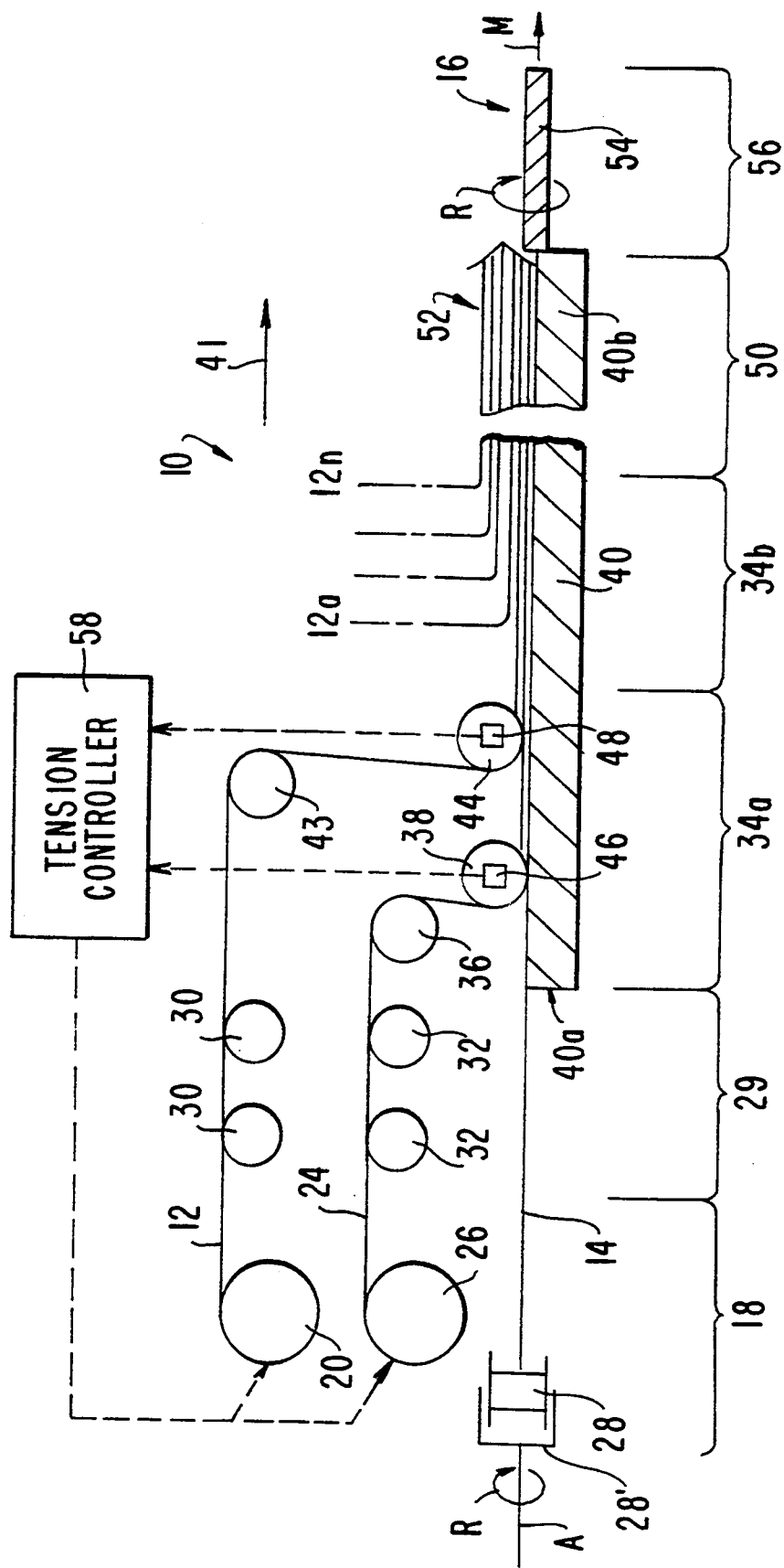
FIG. 1 is a schematic representation of the apparatus in accordance with the present invention illustrating the method for applying stacked optical fiber ribbons about a cylindrical core of a fiber optic cable.

Referring now specifically to the figures, in which identical or similar parts are designated by the same reference numerals throughout, and first referring to FIG. 1, there is shown a schematic representation of the apparatus 10 and method of applying elongate filaments 12 about a cylindrical core of a cable 16. In the specific embodiment to be described, the filaments 12 are optical fiber ribbons or strands and the cable 16 is a fiber optic cable, although it will become evident that the method and apparatus may also be used to manufacture any other cables on which there are helically wound a plurality of elongate electrical or other filaments.

The apparatus 10 has a supply section 18 which includes supply bobbins or reels 20 for supplying the generally flat optical fiber filaments, ribbons or strands 12. Any number of spools 20 may be used consistent with the size or nature of the fiber optic cable to be manufactured. Thus, if the cable is required to use a total of 100 optical fiber ribbons, there would be provided 100 spools 20.

The present invention contemplates the fiber optic ribbons 12 to be applied either to the exterior cylindrical surface of a central or supporting core 14 or applied within helical grooves 22 (FIG. 12) cut or otherwise formed in the surface of the supporting core. Where the ribbons are to be helically wound about a cylindrical surface of the core, however, there are advantageously provided, in accordance with a preferred mode of the present invention, separator elements 24 which separate adjacent filaments or stacks or bundles of filaments or ribbons, as will be more fully described. Like the fiber ribbons 12, the separator elements 24 may be issued from spools or reels 26, the number of such reels or spools being determined by the number of separators 24 required for a given cable size and design. Thus, if 10 separators are required for a given cable design 10 reels or bobbins 26 are used.

The supply section 18 also includes a source or supply bobbin or reel 28 which provides the central supporting core 14 which is caused to rotate about the machine axis A of the apparatus 10 in any conventional manner. This may be done, for example, by supporting the reel 28 within a cradle 28' mounted for rotation about the axis A and driven, for example, in a clockwise direction R. The specific design or size of the core is not critical for purposes of the invention, and any conventional core designs may be used for this purpose. For example, the core may be provided with stranded steel or KEVLAR (an aramid filament) central elements in order to provide increased resistance to stretching and to otherwise stabilize the integrity of the core.

As suggested above, the bobbin or reel 28 supplies the central core 14 which is directed along the machine axis A and is rotated about the machine axis and about its own longitudinal length, in any known or conventional manner. Although only one central core 14 and bobbin 28 are provided, there may be very large numbers of filaments or ribbons 12, bobbins 20, separators 24 and bobbins 26. In the schematic of FIG. 1 it will be understood that the bobbins 20 and 26 are merely representative of the many such bobbins that are actually used. Because of the very large numbers of bobbins 20, 26 that are used it is impractical to station the sometimes hundreds of bobbins proximate to the apparatus 10 and such bobbins must be arranged in banks distributed at different locations both close and remote from the main portion of the apparatus. For this reason the supply section 18 is followed by a guide section 29 which represents guide rollers or sheaves 30,32 which deflect or deviate the directions of the ribbons 12 and the spacers or separators 24, respectively, as required, to guide and converge the same to the assembling and tension-sensing stations 34a and 34b. Station 34a represents a first assembling and tension-sensing section when a plurality of such stations are provided (station 34b) to produce filament units consisting of stacks of more than one filament. When the filament units to be wound about the core 14 consist of only a single ribbon and, as such, ribbons are not stacked, station 34b can be omitted or by-passed.

The station 34a may include a sheave 36 which serves the same or similar function as do the sheaves 32 and which directs the separator 24 toward the final separator sheave 38 for guiding the separator 24 to an upstream end 40a of a suitable support means, such as an elongate assembly table 40, and for dispensing the separator 24 substantially coextensively and along the downstream direction 41 of the table 40 prior to application of the filaments or ribbons 12 on the table. Such initial placement of the separators on the table 40 forms elongate channels 42 (FIGS. 6-9) for receiving the filaments or ribbons 12 similarly introduced by sheaves 43 which serve the same or similar function as do the sheaves 30 and which direct an optical filament or ribbon 12 toward the final filament sheaves 44. Similarly, each final filament sheave 44 deflects an associated filament and dispenses it substantially coextensively and along the downstream direction 41 of the assembly table 40 in a channel 42 formed by adjacent separators 24, when such separators are used with non-grooved cores 14.

As best shown in FIGS. 1 and 4, support means 40 is flat and elongate and has a downstream end 40b arranged substantially along the machine axis A and an upstream end 40a radially spaced from the machine axis A to define an angle e between the table 40 and the machine axis A which corresponds to, i.e. equal to, the desired lay angle of winding of the ribbons 12 about the core 14. While the embodiment being described uses a table 40 as the support means, it will be appreciated that any support components, such as alignment or positioning dies, can be used following the guide section 29, even if some drooping of the filaments occurs.

The sheaves 32, 36 and 38 for the separators 24 and the sheaves 30, 43 and 44 for the ribbons 12 respectively guide and position the associated guided elongate elements to a predetermined number of adjacent positions along a direction transverse to the longitudinal direction of the table 40 (FIG. 3) to form a predetermined number of filament units all simultaneously drawn by the rotating core 14, the number of filament or ribbon units corresponding to the number of helical windings to be wound about the core, such units containing one or more filaments or ribbons depending on whether the helical windings consist of single layer windings or multiple or stacked bundles of ribbons.

In the disclosed embodiment being described 10 filament units or bundles each include a stack of 10 filament or ribbons 12. Therefore, if m is equal to the number of filament units to be wound in 10 grooves 22 or 10 channels 42, m=10. Similarly, if n is equal to the number of filaments or ribbons in each filament unit, n=10. Since FIG. 1 represents the elements needed to produce a single filament unit, 10 such sets of elements must be provided which are offset from each other in substantially parallel planes. Also, since the sheaves 43, 44 account for only one filament or ribbon per unit, a plurality of additional bobbins 20 and sheaves 30, 43 and 44 must be provided (an additional 9 sets in the example) serially arranged along the downstream direction 41 for each ribbon unit, as suggested by ribbons 12a–12n in section 34b, where n=9 in the example.

As best shown in FIGS. 1 and 2, the separators are first deposited on the assembly table 40, and successive layers of ribbons are added to each filament unit by ribbon supply elements 20, 30, 43 and 44. The additional sheaves 43,44 are progressively staggered downstream of the table 40. Once the uppermost ribbon 12n has been deposited on top of each stacked unit each such stacked unit 52 slides along the table, at 50, in a linear manner until each stack unit reaches the downstream end 40b of the table.

It will be clear that once the ribbon units are secured to the core 14 the filament or ribbon units will be drawn along the table 40 by the rotating core for staggered and tangential application of the filament units 52, which are converted into helical windings 54 at the station 56. As indicated, the ribbon units 52 can either be placed into grooves 22 of a core or they can be surface mounted on the core within helical channels 42 formed by adjacent separators 24.

Sensors 46,48 are provided which monitor the tensions in the separators 24 and the ribbons 12 along the feed paths and, preferably, at the respective final sheaves 38,44 at the upstream end 40a of the assembly table at points where the separators and the ribbons are initially positioned or deposited on the table 40. Outputs of the sensors 46,48 can be shown on a control console or can be used as a direct input to a controller 58 which is, in the latter case, responsive to the feedback signals from the sensors to control and maintain the tensions in the filaments or ribbons 12 and the separators 24 at the upstream end 40a of the assembly table at desired levels. Since the separators are not as sensitive to distortions or stretching as are the ribbons it is not always essential that the sensors 46 be provided. However, in the preferred embodiment sensors 46 for the separators are provided to relieve the stresses therein thereby stabilizing the finished cable to minimize possible adverse effects on the finished cable and on the ribbons.

Referring to FIGS. 2 and 3, the assembling section 34a is shown to include a frame 60 which supports the separator guide or deflection sheaves 36 and the final sheaves 38 which are coupled with the sensors 46 for monitoring the tensions in the separators 4. It will be noted that when separators 24 are used (ribbons are mounted on the cylindrical surface of a core) all the separators sheaves 36,38 are housed within the same cage or frame 60 since all the separators 24 are normally simultaneously deposited on the assembly table 40 before the ribbons 12 are deposited, the separators being deposited in parallel relation to each other and to the longitudinal direction of the table 40, as suggested in FIGS. 4, 6 and 8. This creates the longitudinal receiving channels 42 for the stacks or bundles 52 of the ribbons 12. The first cage or frame 64a also forms part of the assembly station 34a, which for the filaments 12 includes the sheaves 43,44 for each of the ribbons 12 deposited in one of the receiving channels 42 and represents one (lowermost) layer of the ribbons in each resulting stack or bundle 52. In the example, therefore, the cage or frame 60 includes 10 sets of sheaves 36,38 to provide 10 parallel channels 42, one of which may be defined between a separator 24 and a retainer 53 as shown in FIGS. 6 and 8. As will be noted from FIGS. 6, 8 and 10, the retainers 53a may consist of simply flat plates for abutting against and retaining a vertical surface of an end separator 24a (FIG. 10) or an end stack or bundle 52 (FIG. 8). However, a retainer 53b may be provided (FIG. 6) which compliments an adjoining retainer so as to provide a suitable channel 42 for a stack or bundle 52. In FIG. 8, a modified retainer 53c is shown which has an inclined abutting surface which contacts a separator 24c to maintain the separator in a generally vertical direction as viewed in the figure. The first cage or frame 64a is included in assembling stations 34a and includes 10 sets of sheaves 43,44 for depositing the first or lowermost layers of the ribbons 12 forming the bundles or stacks 52 in each of the channels 42. The next successive cage 64b likewise includes 10 sets of sheaves 43,44 for depositing the next successive layer of ribbons in each of the 10 channels. Cage 64n represents the last of the 10 sets of sheaves 43,44 for depositing the final or uppermost ribbons on each bundle or stack, n being equal to 10 in the example. If m is equal to the number of channels or filament or ribbon units deposited across the assembly table m=10 in the example.

Referring to FIG. 3 the final separator sheaves 38–38i are shown offset from each other along a direction transverse to the longitudinal direction of the table 40 so that such sheave define unique position staggered along that transverse direction, thereby allowing the sheave 38 to deposit their respective separators at desired positions to form the desired channels. Similarly, the final ribbon or filament sheaves 44–44i are offset from each other or staggered to align each such sheave with an open channel 42 into which a ribbon or filament can be dropped or deposited. The final sheaves 44–44i in each of the successive cages or frames 66a–66n are similarly offset so that the ribbons in each of the succeeding layers are likewise aligned with the respective open channels 42 into which they are received.

It should be clear that the arrangement shown in FIGS. 2 and 3 cannot be used for closed channels 42' of the type shown in FIGS. 5, 10 and 11 formed by inverted U-shaped separators 24a. Here, the filament or ribbon stacks 52 must be formed first and subsequently covered by the separators 24a. This requires that the positions of the cage 60 and cages 64a–64n be reversed, with the cage 60 being placed downstream of all of the cages 64a–64n.

Referring to FIG. 4, the stacks or bundles 52 of ribbons together with their associated separators proceed linearly, at 50 (FIG. 1), to the winding section 56 where the filament bundles, stacks or units together with the separators engage the rotating core 14 at the staggered application point 68. Although not essential, an optional core support member 70 (FIG. 4) is provided which is coextensive with the table 40 along the application point 68 and positioned to be in abutment with at least a portion of the core on the same side of the table relative to the machine axis. It will be appreciated that such a core support member 70 prevents the core from bulging away from the axis A against the actions of the transverse forces, normal to the axis, which would otherwise causing it to deflect or move off the machine axis, adversely affecting the application of winding of the fiber optic units onto the core. Clearly, the more units or filaments that are wound or the less stiff or rigid the core the more it is recommended that a core support member 70 be used. However, the specific nature or design of the core support member 70 is not critical and any configuration for a given setup may be used.

Referring to FIG. 4, the table 40 is shown in fantom outline (at 40') on the opposite side of the machine axis A. This position can be assumed if the sense of the lay angle is to be reversed. For this purpose the table 40 is advantageously mounted for movement about pivot 72 to that the lay angles e can be adjusted and reversed.

Three examples of possible optical cables 16, based on a cylindrical core, easily achievable with the present apparatus and method are illustrated in FIGS. 6–11. It should be evident that numerous other cable constructions can be obtained, including multiple co-axial layers of individual or stacks or bundles of fiber optic ribbons or filaments. Referring to FIG. 12, the apparatus can also manufacture cables based on slotted cores where the slotted core is either unwound from a rotating pay-off-reel or extruded in-line with a slotted die through which a rotating tension resistant member is pulled through.

As will be appreciated when the ribbons are inserted into slotted cores, the separators of the type shown in FIGS. 6–11 can be eliminated since each stack or bundle of ribbons is nested within and held in place by the side walls of the respective grooves or slots into which the ribbons are received. However, the elimination of the separators may require additional steps to be taken to maintain the integrity of the bundles while they move along the table 40 prior to insertion into designated grooves or slots. Such measures may include the use of longitudinal ribs 60 (FIG. 12) which extend along the table 40 and which are spaced comparably to the ribs 24b to effectively create equivalent channels for maintaining the orientations and positions of the ribbons. Alternatively, one or more positioning dies 62 (FIG. 12) may be used along or in place of the table 40 for orienting and positioning the ribbons in each bundle or stack in the desired positions relative to each other. At the application point, insertion tools 64 (FIG. 4) may be used for depositing each stack of pre-arranged and pre-oriented ribbons to force the ribbons upon being deposited to have the proper orientations upon insertion, at which time the ribbons become constrained by the groove walls.

It should also be evident that the apparatus and method described allows a much simpler filament path and also allows, in the case of ribbon packets, stacks or bundles, the possibility of each ribbon sliding on adjacent counterparts very easily since, after the final sheaves 44 the ribbons proceed in a substantially straight path to the staggered application point with minimal friction between adjacent ribbons and small relative movement between elements to be wound. Any meaningful friction applied prior to the final sheaves 44 having been compensated for by the sensors 48 and controller 58.

By easily and efficiently allowing the formation of packets, stacks or bundles of optical ribbons the apparatus and method described above makes it possible and readily manageable to handle large numbers of optical fiber ribbons and manufacture large optical cables which can include hundreds of ribbons.

Although preferred embodiments of the present invention have been described and illustrated, it will be apparent to those skilled in the art that various modifications may be made without departing from the principles of the invention. For example, while the assembly table has been shown as being a smooth, flat table, the table can assume other shapes. Thus, the table can be curved or profiled at its supporting surface, the only requirement being that the table provide as low friction on the filaments or ribbons and that the upstream end of the table 40b be positioned at the application point 68 to provide staggered and tangential application of the filament units (and separators) about the core at the winding station as described. Also, the sensors for both the filaments as well as the separators have been described as being coupled to the final sheaves 46,48. This provides for optimum compensational control of the filaments and separators prior to deposition thereof onto the assembly table 40. However, it should be evident that the sensors can be coupled with any of the other sheaves in the line upstream of the final sheaves, with different degrees of advantage. Also, as indicated, the cage 60 for the separators and the cages 64a-64n can be reversed to provide for insertion of the stacked filaments or ribbons within open or closed channels. Clearly, the number of sheaves provided in each of these cages can be modified as necessary to assemble a cable of any size or design.

For ease of threading, support means can be used without the continuous support of a table or other flat surface, as indicated, by using guides for the filaments and the separators to guide these elements to the inserting longitudinal die at the winding or application station 56.

In FIG. 13, the support guide table or stand 40 is shown to include integrally formed longitudinal ribs 80 which extend along the support table and are spaced from each other to create channels 81 to maintain the integrity of the formed stacks of flat ribbons or filaments 52. However, in order to assure that the flat ribbons or filaments are maintained properly positioned and oriented at the application point, there is advantageously provided a lattice frame 82 (or other functionally equivalent structure) formed of space vertical members 84 and horizontal separators 86 as shown to form or define channels or openings 88 dimensioned to receive individual filaments or ribbons 12 as shown. By using this arrangement, the filaments in each group of filaments forming a filament unit or stack are maintained in desired positions and orientations relative to each other. The frame 82 is advantageously positioned along the longitudinal length of the support table 4 in an area proximate to the application point or the winding station at which the filaments are applied to the core.

I claim:

1. Apparatus for helically winding a plurality of filaments about a cylindrical core comprising first supply means for supplying a rotating central core for longitudinal movement substantially along a machine axis of the apparatus; second supply means for supplying a plurality of filaments to be helically wound about the core; a winding station downstream of said first supply means and arranged substantially along said machine axis; support means having a downstream end arranged substantially along said machine axis and an upstream end offset from said machine axis to define an angle between said support means and said machine axis which substantially equals a desired lay angle of the filaments about the core for supporting and guiding said filaments between said upstream and downstream ends; guide means for guiding the filaments from said second supply means to said upstream end of said support means and for positioning the filaments in a predetermined number of adjacent positions along a direction substantially transverse to said support means to form a predetermined number of filament units no greater than the number of helical windings to be applied about the core, said filament units being drawn along said support means by the rotating core for staggered and tangential application of the filament units about the core at said winding station at said downstream end of said support means; sensor means for sensing the individual tensions in each of the filaments; and tension compensating means for controlling tensions in the filaments based on information provided by said sensor means, whereby said filaments are wound on the core when said filaments are moved substantially linearly along said support means with controlled tensions therein.

2. Apparatus as defined in claim 1, wherein said support means comprises a substantially flat elongate table having a top surface, on which the filaments are deposited, which is in a substantially horizontal plane.

3. Apparatus as defined in claim 1, further comprising a linear die substantially coextensive with said support means at the point of application of the filament units about the core and positioned proximate to at least a portion of the core on the same side as said support means relative to said machine axis to support the core and counteract the lateral components of the winding tensions in a direction perpendicular to the longitudinal axis of the core.

4. Apparatus as defined in claim 1, wherein said support means comprises a table, and further comprising retainer means along at least one edge of said table to retain filament units as they are moved between said upstream and downstream ends of said table.

5. Apparatus as defined in claim 1, wherein said support means comprises a table mounted for selective movements of said upstream end to opposite sides of said machine axis while maintaining said downstream end substantially at said winding station, whereby lay angles can be modified and winding senses reversed.

6. Apparatus as defined in claim 5, wherein said downstream end of said table is pivotally mounted.

7. Apparatus as defined in claim 1, further comprising third supply means for supplying a plurality of elongate separators for separating adjacent units of filaments.

8. Apparatus as defined in claim 1, wherein said second supply means comprises spools of fiber optic strands or ribbons.

9. Apparatus as defined in claim 1, wherein said guide means includes final sheaves one for each of the filaments which are arranged to dispense respective filaments substantially coextensively and along said downstream direction of said support means.

10. Apparatus as defined in claim 9, wherein said sensor means comprises sensors coupled to said final sheaves for monitoring the tensions of the filaments at said final sheaves.

11. Apparatus as defined in claim 7, wherein said guide means includes final sheaves one for each of the separators which are arranged to dispense respective separators substantially coextensively and along the downstream direction of support means.

12. Apparatus as defined in claim 11, wherein said sensor means comprises sensors coupled to said final sheaves for monitoring the tensions in the separators at said final sheaves.

13. Apparatus as defined in claim 7, wherein said guide means comprises a separator deflection station at said upstream end of said support means for deflecting the directions of the separators and dispensing the separators substantially coextensively and along the downstream direction of said support means.

14. Apparatus as defined in claim 13, wherein said separator deflection station comprises m final deflection sheaves for dispensing m separators along the downstream direction of said support means corresponding to said predetermined number of filament units to be wound about the core.

15. Apparatus as defined in claim 1, wherein said guide means comprises at least one filament deflection station at said upstream end of said support means for deflecting the directions of the filaments and dispensing the filaments substantially coextensively and along the downstream direction of said support means.

16. Apparatus as defined in claim 15, wherein said filament deflection station comprises m final deflection sheaves for dispensing m filaments along the downstream direction of said support means corresponding to said predetermined number of filament units to be wound about the core.

17. Apparatus as defined in claim 16, wherein a plurality of filament deflection stations are provided serially arranged along the longitudinal direction of said support means.

18. Apparatus as defined in claim 15, wherein said guide means comprises a separator deflection station upstream of said filament deflection station.

19. Apparatus as defined in claim 18, wherein each filament deflection station dispenses one filament for each filament unit position along said table transverse direction, n filament deflection stations being serially arranged along said support means to provide bundles of n stacked filaments of each of said m filament unit positions.

20. Apparatus as defined in claim 1, wherein said support means comprises a substantially flat elongate table.

21. Apparatus as defined in claim 1, wherein said sensor means is provided at points proximate to said upstream end of said support means, whereby said filaments can be moved along said support means with controlled tension therein substantially independently of forces acting on the filaments upstream of said support means.

22. Apparatus as defined in claim 1, wherein said tension compensating means is responsive to said sensor means.

23. Apparatus as defined in claim 1, wherein said tension compensating means is manually adjustable in response to indications of said sensor means.

24. Method of helically winding a plurality of filaments about a cylindrical core comprising the steps of supplying a rotating central core for longitudinal movement substantially along a machine axis of the apparatus; supplying a plurality of filaments to be helically wound about the core; arranging a winding station downstream of said first supply means substantially along said machine axis; providing support means having a downstream end arranged substantially along said machine axis and an upstream end offset from said machine axis to define an angle between said support means and said machine axis which substantially equals a desired lay angle of the filaments about the core for supporting and guiding said filaments between said upstream and downstream ends; guiding the filaments from said second supply means to said upstream end of said support means and positioning the filaments in a predetermined number of adjacent positions along a direction substantially transverse to said support means to form a predetermined number of filament units no greater than the number of helical windings to be applied about the core, said filament units being drawn along said support means by the rotating core for staggered and tangential application of the filament units about the core at said winding station at said downstream end of said support means; sensing the individual tensions in each of the filaments; and controlling the tensions in the filaments based on the sensed tensions, whereby said filaments are wound on the core when said filaments are moved substantially linearly along said support means with controlled tensions therein.

25. Apparatus for helically winding a plurality of filaments about a cylindrical core comprising first supply means for supplying a rotating central core for longitudinal movement substantially along a machine axis of the apparatus; second supply means for supplying a plurality of filaments to be helically wound about the core; a winding station downstream of said first supply means and arranged substantially along said machine axis; support means having a downstream end arranged substantially along said machine axis and an upstream end offset from said machine axis to define an angle between said support means and said machine axis which substantially corresponds to the desired lay angle of the filaments about the core for supporting and guiding said filaments between said upstream and downstream ends; guide means for guiding the filaments from said second supply means to said upstream end of said support means and for positioning the filaments in a predetermined number of adjacent positions along a direction substantially transverse to said support means to form a predetermined number of filaments units no greater than the number of helical windings to be applied about to the core, said filament units being drawn along said support means by the rotating core for staggered and tangential application of the filament units about the core at said winding station at said downstream end of said support means; and positioning means for maintaining the orientations and positions of the filaments forming the filament units at least in a region proximate to said winding station to thereby insure the integrity of the filaments units as they are applied about the core.

26. Apparatus as defined in claim 25, wherein said support means comprises said positioning means.

27. Apparatus as defined in claim 25, wherein said positioning means includes longitudinal ribs which extend along said support means spaced from each other to create for maintaining the orientations and positions of the filaments.

28. Apparatus as defined in claim 25, wherein said support means comprises a plurality of positioning dies for orienting and positioning the filaments in each group of filaments forming a filament unit in desired positions relative to each other.

29. Apparatus as defined in claim 25, wherein the core has a plurality of helical grooves, and said positioning means comprises insertion tools used to force each filament unit to have proper orientation upon insertion into a groove until the filaments are constrained by the walls of the grooves.

30. Apparatus for helically winding a plurality of filaments about a cylindrical core having a plurality of helical grooves comprising first supply means for supplying a rotating central core for longitudinal movement substantially along a machine axis of the apparatus; second supply means for supplying a plurality of filaments to be helically wound about the core; a winding station downstream of said first supply means and arranged substantially along said machine axis; support means having a downstream end arranged substantially along said machine axis and an upstream end offset from said machine axis to define an angle between said support means and said machine axis which substantially equals a desired lay angle of the filaments about the core for supporting and guiding said filaments between said upstream and downstream ends; guide means for guiding the filaments from said second supply means to said upstream end of said support means and for positioning the filaments in a predetermined number of adjacent positions along a direction substantially transverse to said support means to form a predetermined number of filament units no greater than the number of helical windings to be applied about the core, said filament units being drawn along said support means by the rotating core for staggered and tangential application of the filament units about the core at said winding station at said downstream end of said support means; and insertion means in a region proximate to said winding station for depositing each filament unit within a helical groove while insuring proper orientation of the filaments within the filament units.

* * * * *